(12) United States Patent
Okazaki et al.

(10) Patent No.: US 12,409,740 B2
(45) Date of Patent: Sep. 9, 2025

(54) ELECTRIC WORK VEHICLE

(71) Applicant: KUBOTA CORPORATION, Osaka (JP)

(72) Inventors: Kazuto Okazaki, Sakai (JP); Shinichi Kawabata, Sakai (JP); Daisuke Miyazaki, Sakai (JP); Naoto Mantoku, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/734,667

(22) Filed: Jun. 5, 2024

(65) Prior Publication Data

US 2024/0317074 A1   Sep. 26, 2024

Related U.S. Application Data

(63) Continuation of application No. PCT/JP2022/038590, filed on Oct. 17, 2022.

(30) Foreign Application Priority Data

Dec. 27, 2021   (JP) ................................. 2021-213186

(51) Int. Cl.
*B60L 50/51* (2019.01)
*B60K 1/00* (2006.01)

(52) U.S. Cl.
CPC ........ *B60L 50/51* (2019.02); *B60K 2001/006* (2013.01); *B60L 2200/40* (2013.01); *B60L 2210/12* (2013.01); *B60L 2210/40* (2013.01)

(58) Field of Classification Search
CPC .. B60L 50/51; B60L 2200/40; B60L 2210/12; B60L 2210/40; B60K 2001/006
See application file for complete search history.

(56) References Cited

U.S. PATENT DOCUMENTS

| | | | | |
|---|---|---|---|---|
| 2018/0338416 | A1* | 11/2018 | Uemura | ............... A01D 34/008 |
| 2020/0290465 | A1* | 9/2020 | Matsuda | .................. B60K 1/04 |
| 2020/0365854 | A1* | 11/2020 | Yamada | .............. H01M 50/249 |
| 2021/0316713 | A1* | 10/2021 | Vilar | .......................... B60L 1/20 |
| 2022/0234434 | A1 | 7/2022 | Tottori et al. | |

FOREIGN PATENT DOCUMENTS

JP   2021-000953 A   1/2021

OTHER PUBLICATIONS

Official Communication issued in International Patent Application No. PCT/JP2022/038950, mailed on Dec. 20, 2022.

* cited by examiner

*Primary Examiner* — Rexford N Barnie
*Assistant Examiner* — Duc M Pham
(74) *Attorney, Agent, or Firm* — Keating & Bennett, LLP (57) ABSTRACT

An electric work vehicle includes a first removable cover to cover a portion of a first harness exposed downward through a first opening, a second removable cover to cover a portion of a second harness exposed downward through a second opening, and a third removable cover to cover a portion of a motor exposed downward through a third opening.

4 Claims, 6 Drawing Sheets

ELECTRIC WORK VEHICLE

CROSS REFERENCE TO RELATED APPLICATIONS

This application claims the benefit of priority to Japanese Patent Application No. 2021-213186 filed on Dec. 27, 2021 and is a Continuation Application of PCT Application No. PCT/JP2022/038590 filed on Oct. 17, 2022. The entire contents of each application are hereby incorporated herein by reference.

BACKGROUND OF THE INVENTION

1. Field of the Invention

The present invention relates to electric work vehicles.

2. Description of the Related Art

A known example of an electric work vehicle is disclosed in JP 2021-953A. The electric work vehicle disclosed in JP 2021-953A includes a battery ("travel battery (4)"), an inverter ("inverter (14)") configured to convert DC power from the battery to AC power, a motor ("motor (M)") driven by electric power supplied from the inverter, a travel device ("front wheels (10) and rear wheels (11)") driven by the motor, and a DC-DC converter ("voltage converter (19)") configured to step down electric power from the battery.

SUMMARY OF THE INVENTION

In an electric work vehicle such as that as described above, usually, the battery and the DC-DC converter are connected to each other by a harness, and the inverter and the motor are connected to each other by a harness. For such an electric work vehicle, it is desired to facilitate the maintenance of the harnesses and the motor and to prevent the harnesses and the motor from being damaged by a flying stone from the ground.

Under these circumstances, there is demand for an electric work vehicle that provides enhanced ease of maintenance of the harnesses and the motor and is configured to prevent the harnesses and the motor from being damaged by a flying stone from the ground.

An example embodiment of the present invention provides an electric work vehicle including a battery, an inverter to convert DC power from the battery to AC power, a motor drivable by electric power supplied from the inverter, a travel device drivable by the motor, a DC-DC converter to step down electric power from the battery, a first harness connecting the battery and the DC-DC converter, a second harness connecting the inverter and the motor, a body frame including a first opening through which the first harness is exposed downward, a second opening through which the second harness is exposed downward, and a third opening through which the motor is exposed downward, and supporting the battery, the inverter, the motor, and the DC-DC converter, a first removable cover covering a portion of the first harness exposed downward through the first opening, a second removable cover covering a portion of the second harness exposed downward through the second opening, and a third removable cover covering a portion of the motor exposed downward through the third opening.

With this characteristic configuration, even when a stone flies from the ground toward the first harness, the second harness, or the motor, the stone is blocked by the first cover, the second cover, or the third cover. Thus, the first harness, the second harness, and the motor can be prevented from being damaged by a flying stone from the ground.

In addition, during maintenance, the first cover, the second cover, and the third cover are removed, and the first harness, the second harness, and the motor are thus exposed downward. As a result, it is easy to perform the maintenance of the first harness, the second harness, and the motor by accessing the first harness, the second harness, and the motor from below.

Furthermore, in an example embodiment of the present invention, it is preferable that the motor is water-cooled, and the third cover covers a water-cooled portion of the motor.

With this characteristic configuration, the water-cooled portion of the motor can be protected by the third cover.

Furthermore, in an example embodiment of the present invention, it is preferable that at least any of the first cover, the second cover, or the third cover includes a drain hole.

With this characteristic configuration, at least any of the first cover, the second cover, or the second cover allows water accumulating inside to be discharged through the drain hole.

Furthermore, in an example embodiment of the present invention, it is preferable that a transmission shaft to transmit motive power from the motor to the travel device is provided, and the transmission shaft is held by at least any of the first cover, the second cover, or the third cover.

With this characteristic configuration, at least any of the first cover, the second cover, or the second cover can be used as a support for the transmission shaft.

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a left side view showing arrangement of an inverter and the like.

DETAILED DESCRIPTION OF THE EXAMPLE EMBODIMENTS

Example embodiments of the present invention will be described based on the drawings. In the following description, unless otherwise stated, the direction of an arrow F and the direction of an arrow B in the drawings will be respectively referred to as "the front side" and "the rear side", and the direction of an arrow L and the direction of an arrow R in the drawings will be respectively referred to as "the left side" and "the right side". Also, the direction of an arrow U and the direction of an arrow D in the drawings will be respectively referred to as "the upper side" and "the lower side".

Figure 1:
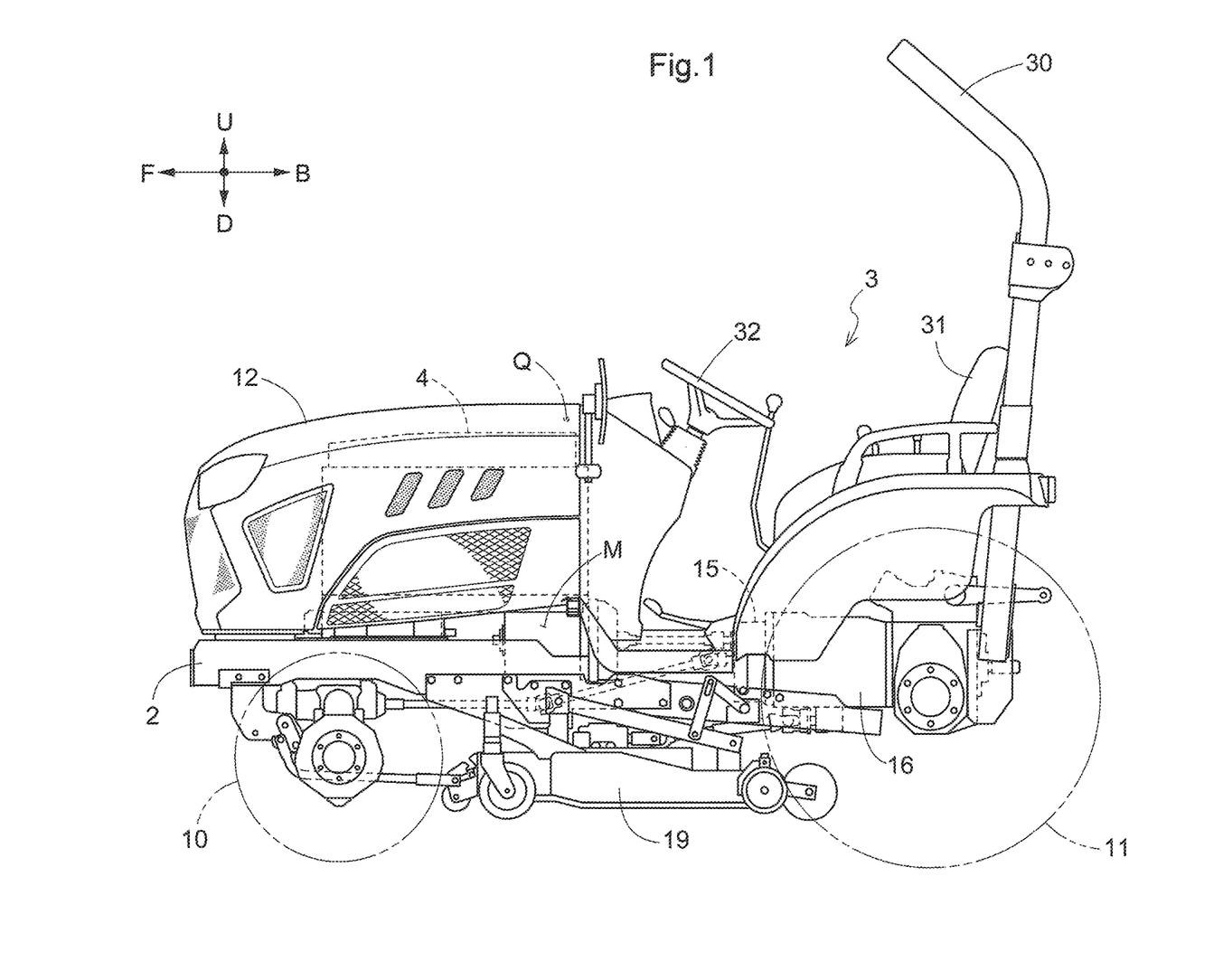
FIG. 1 is a left side view of a tractor.

The following describes a tractor according to the present example embodiment. As shown in FIG. 1, the tractor includes left and right front wheels 10, left and right rear wheels 11, and a cover 12.

The tractor also includes a body frame 2 and a driving section 3. The body frame 2 is supported by the left and right front wheels 10 and the left and right rear wheels 11.

The cover 12 is disposed in a front portion of the body of the tractor. The driving section 3 is behind the cover 12. In other words, the cover 12 is in front of the driving section 3.

The driving section 3 includes a protective frame 30, a driver's seat 31, and a steering wheel 32. An operator can sit on the driver's seat 31. Accordingly, the operator can get on the driving section 3. The operator steers the left and right front wheels 10 by operating the steering wheel 32. The operator can perform various driving operations in the driving section 3.

The tractor includes a battery 4. The cover 12 is pivotable about an opening/closing axis Q extending in the left-right direction of the body. Accordingly, the cover 12 is openable and closable. When the cover 12 is closed, the battery 4 is covered by the cover 12.

Figure 2:
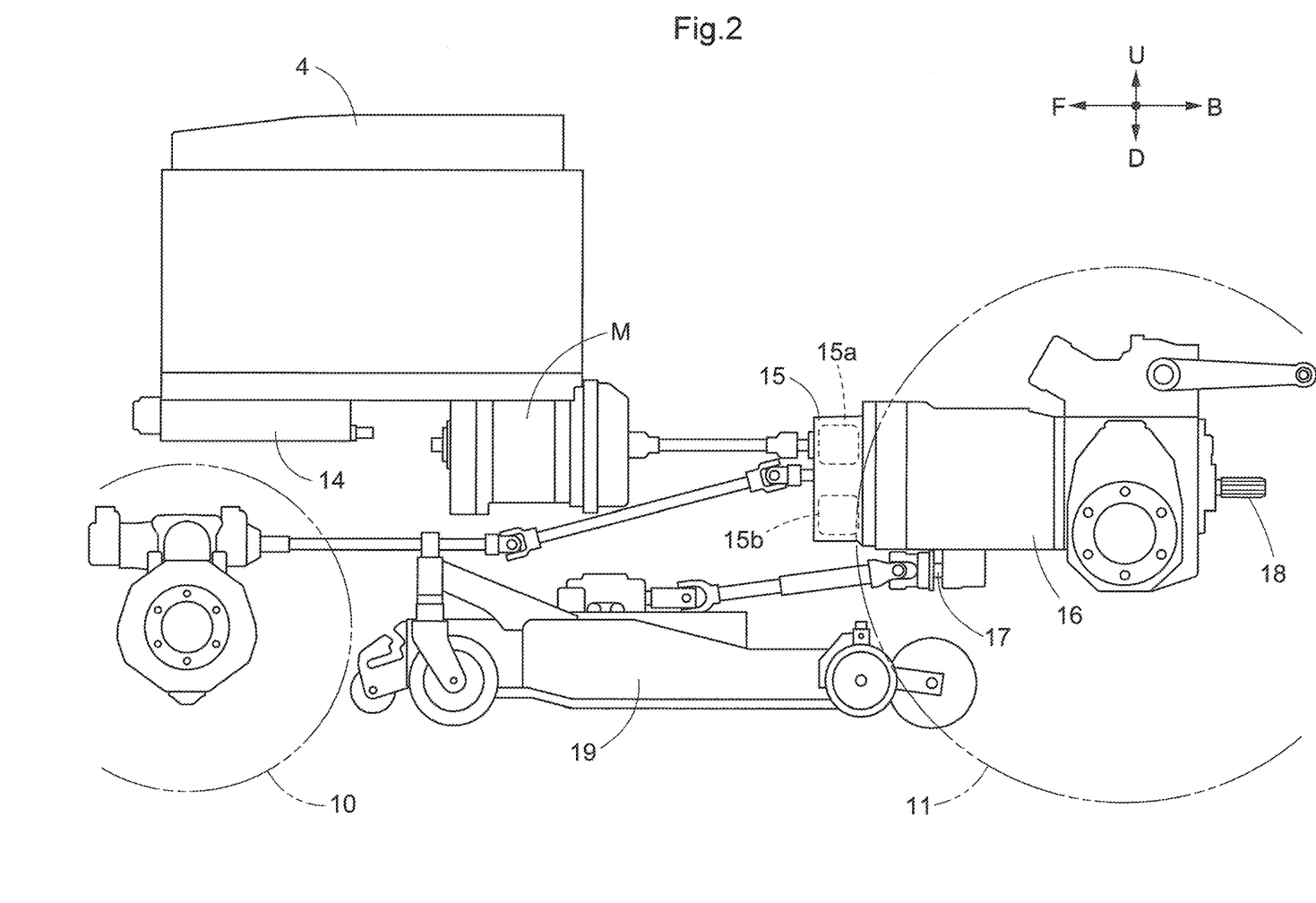

As shown in FIG. 2, the tractor includes an inverter 14 and a motor M. The battery 4 supplies electric power to the inverter 14. The inverter 14 converts DC power supplied from the battery 4 to AC power, and supplies the AC power to the motor M. The motor M is driven by the AC power supplied from the inverter 14.

Figure 3:
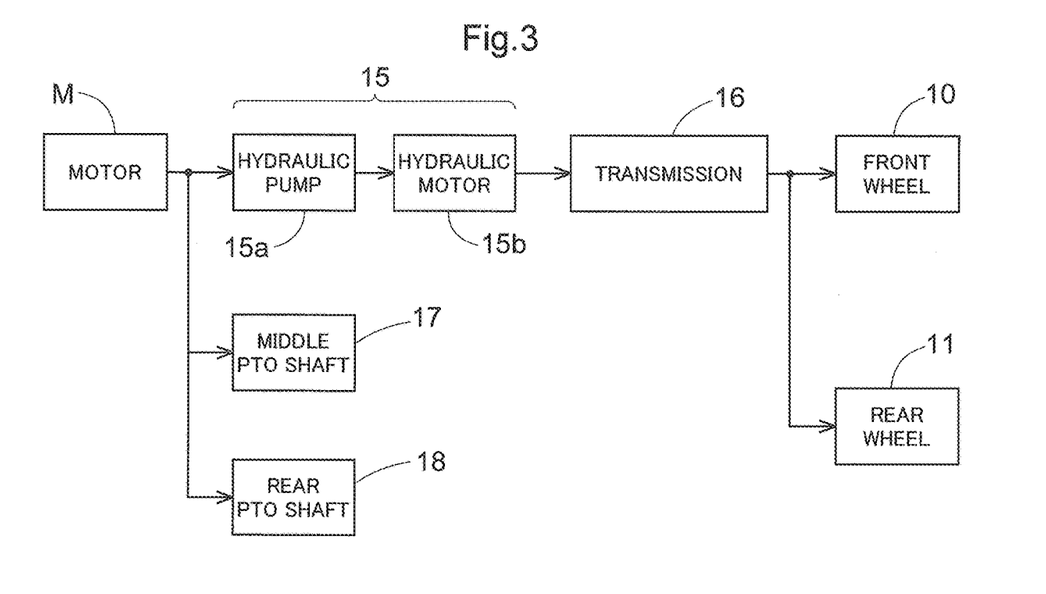
FIG. 3 is a diagram showing a flow of motive power transmission.

As shown in FIGS. 2 and 3, the tractor includes a hydraulic continuously variable transmission 15 and a transmission 16. As shown in FIG. 3, the hydraulic continuously variable transmission 15 includes a hydraulic pump 15a and a hydraulic motor 15b.

The hydraulic pump 15a is driven by rotational motive power transmitted from the motor M. As a result of the hydraulic pump 15a being driven, rotational motive power is output from the hydraulic motor 15b. The hydraulic continuously variable transmission 15 is configured to change the speed of rotational motive power between the hydraulic pump 15a and the hydraulic motor 15b. Also, the hydraulic continuously variable transmission 15 is capable of changing the transmission ratio in a stepless manner.

The rotational motive power output from the hydraulic motor 15b is transmitted to the transmission 16. The speed of the rotational motive power transmitted to the transmission 16 is changed by a gear transmission mechanism included in the transmission 16, and the rotational motive power is distributed to the left and right front wheels 10 and the left and right rear wheels 11. Thus, the left and right front wheels 10 and the left and right rear wheels 11 are driven.

As shown in FIGS. 2 and 3, the tractor also includes a middle PTO shaft 17 and a rear PTO shaft 18. Rotational motive power output from the motor M is distributed to the hydraulic pump 15a, the middle PTO shaft 17, and the rear PTO shaft 18. The middle PTO shaft 17 and the rear PTO shaft 18 are rotated by the distributed rotational motive power.

If a work device is connected to the middle PTO shaft 17 or the rear PTO shaft 18, the work device is driven by rotational motive power transmitted by the middle PTO shaft 17 or the rear PTO shaft 18. For example, in the present example embodiment, a grass cutting device 19 is connected to the middle PTO shaft 17 as shown in FIG. 2. The grass cutting device 19 is driven by rotational motive power transmitted by the middle PTO shaft 17.

Figure 4:
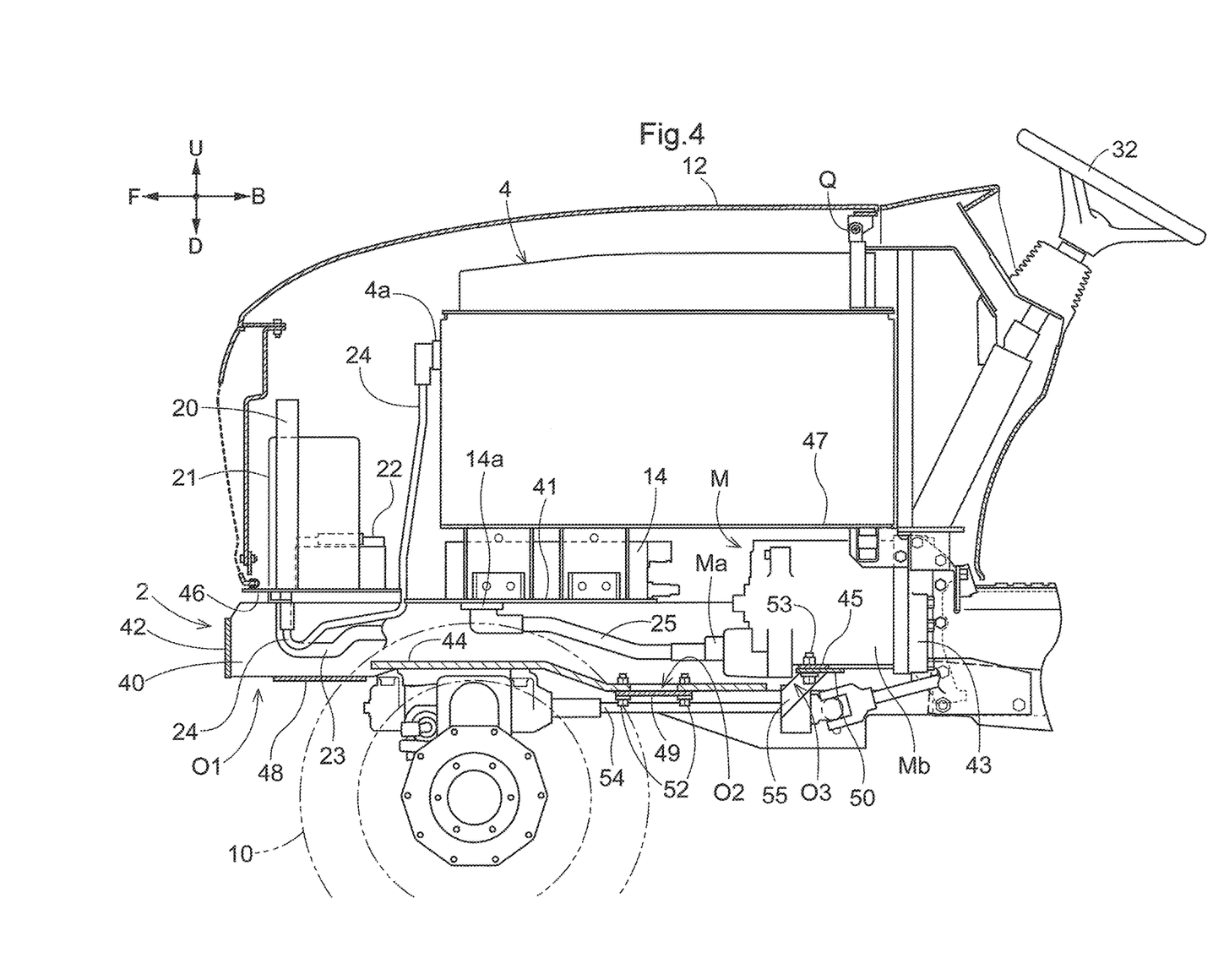
FIG. 4 is a left side sectional view showing a configuration of a front portion of a body of the tractor.
Figure 5:
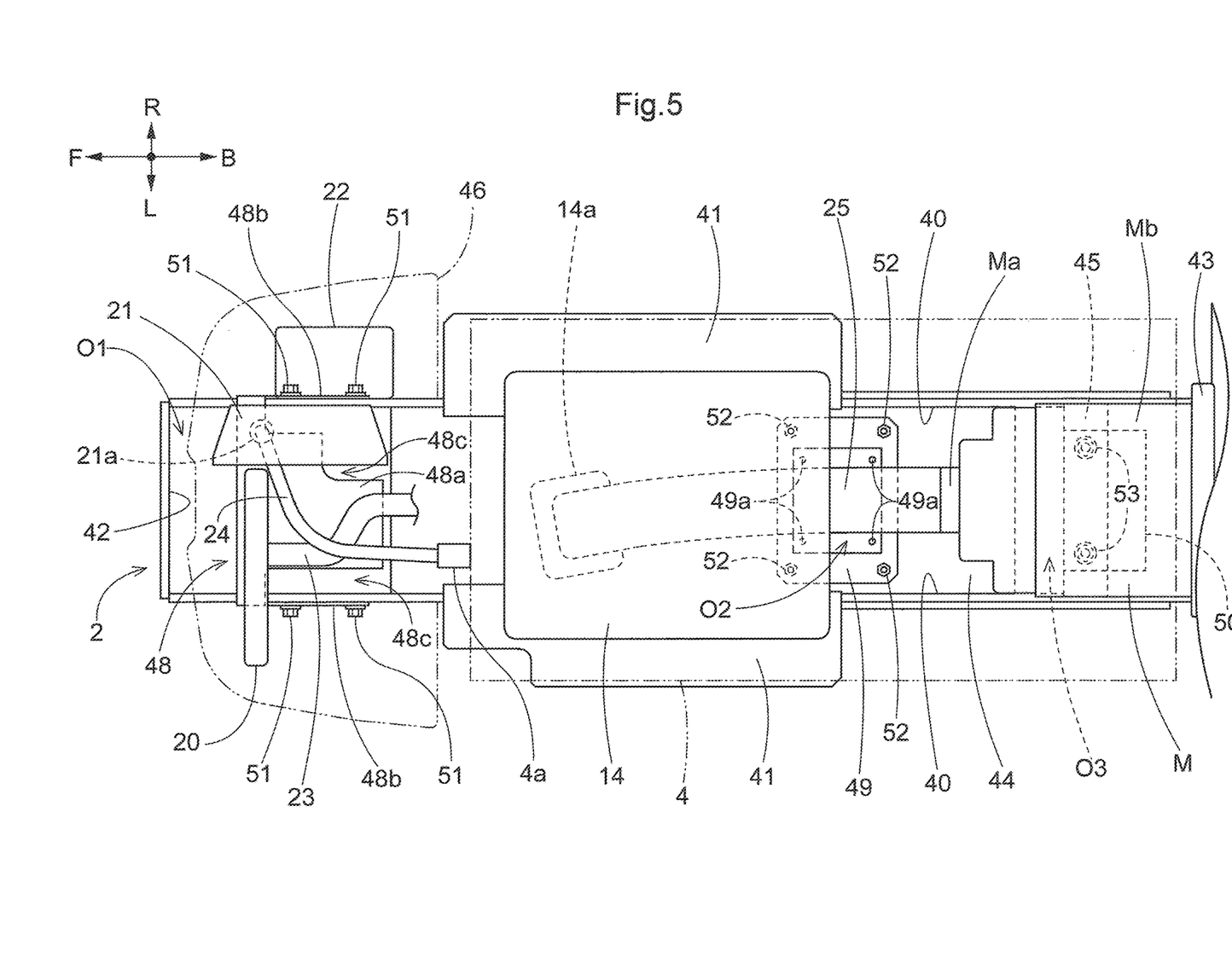
FIG. 5 is a plan view showing the configuration of the front portion of the body of the tractor.
Figure 6:
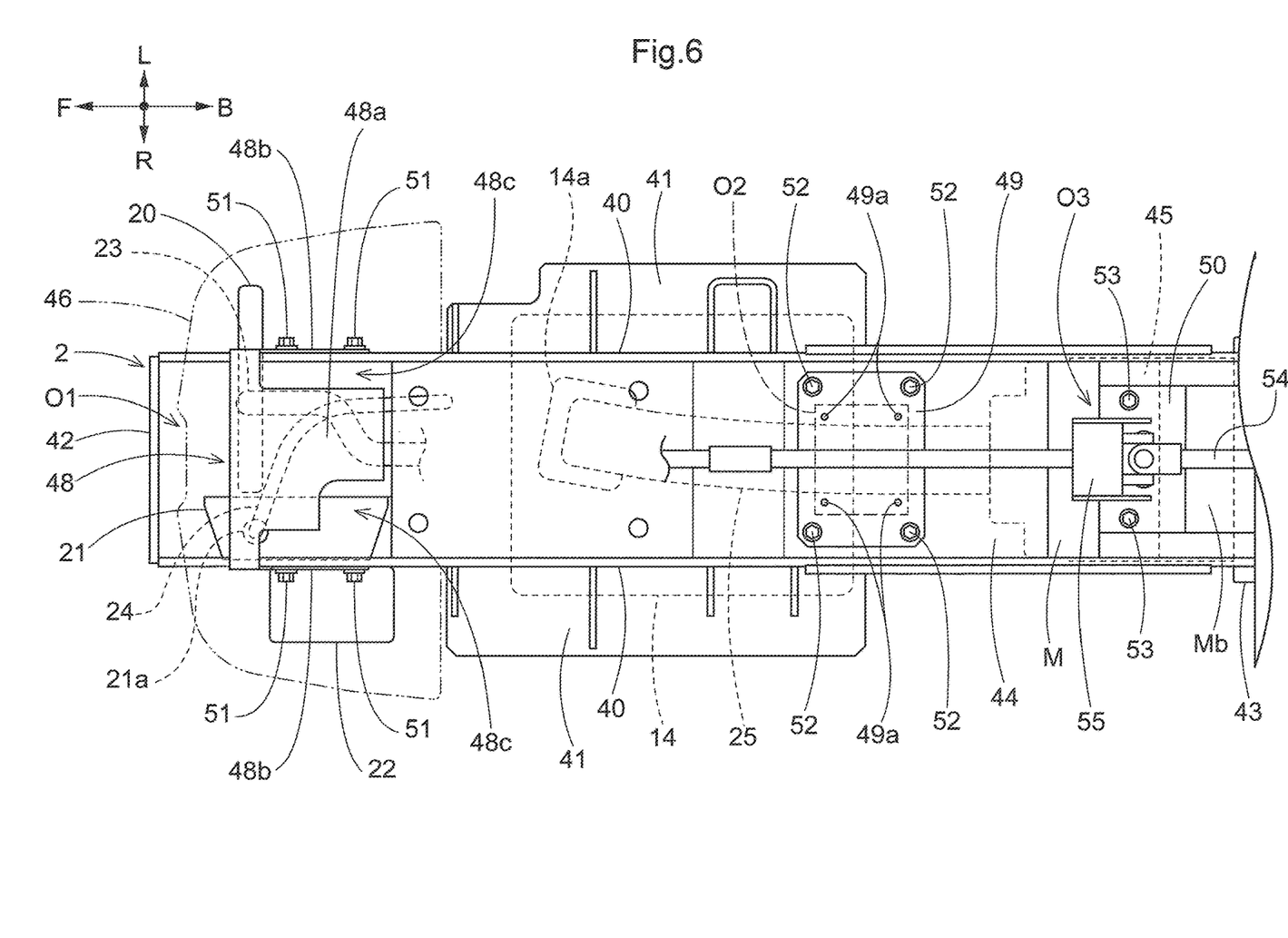
FIG. 6 is a bottom view showing the configuration of the front portion of the body of the tractor.

As shown in FIGS. 4 to 6, the motor M is behind the inverter 14. The motor M and the inverter 14 are below the battery 4. The motor M and the inverter 14 are aligned in the front-rear direction of the body. Specifically, the motor M and the inverter 14 are aligned in the front-rear direction of the body such that the inverter 14 is on the front side and the motor M is on the rear side. The tractor includes a radiator 20, a DC (direct current)-DC converter 21, and a battery 22. The radiator 20, the DC-DC converter 21, and the battery 22 are in front of the battery 4. The DC-DC converter 21 is to the immediate right of the radiator 20. The battery 22 is to the immediate right of the DC-DC converter 21.

Here, all the inverter 14, the motor M, and the DC-DC converter 21 are water-cooled, for example. The radiator 20 cools cooling water to cool the inverter 14, the motor M, and the DC-DC converter 21. A cooling hose 23 is connected to a lower portion of the radiator 20 and extends toward the inverter 14. The DC-DC converter 21 steps down electric power supplied from the battery 4. The battery 22 is to supply electric power to various electric components. The electric power (high voltage) supplied from the battery 4 is stepped down by the DC-DC converter 21 before being used to charge the battery 22 as low-voltage electric power.

As shown in FIGS. 4 to 6, a first harness 24 connecting the battery 4 and the DC-DC converter 21 extends from the battery 4 to the DC-DC converter 21. The first harness 24 is to supply electric power from the battery 4 to the DC-DC converter 21. An output section 4a to which the first harness 24 is connected is provided at an upper portion of a front surface of the battery 4. An input section 21a to which the first harness 24 is connected is provided at a front portion of a lower surface of the DC-DC converter 21. The first harness 24 is routed so as to extend downward from the output section 4a and forward toward the input section 21a.

A second harness 25 connecting the inverter 14 and the motor M extends from the inverter 14 to the motor M. The second harness 25 is to supply electric power from the inverter 14 to the motor M. An output section 14a to which the second harness 25 is connected is provided at a front portion of a lower surface of the inverter 14. An input section Ma to which the second harness 25 is connected is provided at a front end of the motor M. The second harness 25 is routed so as to extend rearward from the output section 14a toward the input section Ma.

As shown in FIGS. 4 to 6, the body frame 2 includes left and right side plates 40, left and right bases 41, a front plate 42, a rear plate 43, a bottom plate 44, and a lateral plate 45. The left and right side plates 40 are spaced apart from each other in the left-right direction of the body. A space between the left side plate 40 and the right side plate 40 is used as a space in which the motor M is disposed. The radiator 20, the DC-DC converter 21, and the battery 22 are supported on a base 46. The base 46 is supported on front portions of the left and right side plates 40.

The left base 41 extends leftward from an upper edge of the left side plate 40. The right base 41 extends rightward from an upper edge of the right side plate 40. The inverter 14 is supported on the left and right bases 41. The battery 4 is supported on a support stand 47. The support stand 47 is supported on the left and right bases 41 and the rear plate 43.

The front plate 42 extends from a front end of the left side plate 40 to a front end of the right side plate 40. The rear plate 43 extends from a rear end of the left side plate 40 to a rear end of the right side plate 40. The motor M is supported by the rear plate 43. The bottom plate 44 extends from a lower edge of the left side plate 40 to a lower edge of the right side plate 40. The lateral plate 45 is behind the bottom plate 44 and extends from the left side plate 40 to the right side plate 40.

A first opening O1 is provided in a portion of the body frame 2 surrounded by the front plate 42, a front edge of the bottom plate 44, and the left and right side plates 40. A second opening O2 is provided in a portion of the bottom plate 44 below a rear portion of the second harness 25. A third opening O3 is provided in a portion of the body frame 2 surrounded by the rear plate 43, a rear edge of the bottom plate 44, and the left and right side plates 40. That is, the body frame 2 has the first opening O1, the second opening O2, and the third opening O3.

The first opening O1 is configured to expose the first harness 24 and the cooling hose 23 in the downward direction. The second opening O2 is configured to expose the second harness 25 in the downward direction. The third opening O3 is configured to expose the motor M (specifically, a portion (water-cooled portion) Mb of the motor M in which cooling water flows) in the downward direction.

As shown in FIGS. 4 to 6, a first cover 48, a second cover 49, and a third cover 50 are attached to the body frame 2. The first cover 48 is configured to cover the first opening O1. More specifically, the first cover 48 is configured to cover a portion of the first harness 24 exposed downward through the first opening O1 and a portion of the cooling hose 23 exposed downward through the first opening O1. The portion of the first harness 24 exposed downward through the first opening O1 and the portion of the cooling hose 23 exposed downward through the first opening O1 are covered by the first cover 48 from below.

The first cover 48 includes a horizontal surface portion 48a, left and right bent portions 48b, and recessed portions 48c. The bent portions 48b have shapes that are bent upward relative to the horizontal surface portion 48a so as to extend along the respective side plates 40. The recessed portions 48c are configured to accommodate therein structures (e.g., a structure supporting a front portion of the grass cutting device 19) around the first cover 48, and thus, the first cover 48 does not obstruct the structures around the first cover 48. The first cover 48 is fixed to the left and right side plates 40 by a plurality of bolts 51. Specifically, each bent portion 48b is pressed against the corresponding side plate 40 from the lateral outer side and is fixed to the side plate 40 by a plurality of (two in the present example embodiment) bolts 51.

The second cover 49 is configured to cover the second opening O2. More specifically, the second cover 49 is configured to cover a portion of the second harness 25 exposed downward through the second opening O2. The portion of the second harness 25 exposed downward through the second opening O2 is covered by the second cover 49 from below.

The second cover 49 includes a plurality of (for example, four in the present example embodiment) drain holes 49a. The drain holes 49a are provided in a portion of the second cover 49 that faces the second opening O2. The second cover 49 is pressed against the bottom plate 44 from below and is fixed to the bottom plate 44 by a plurality of (for example, four in the present example embodiment) bolts 52.

The third cover 50 is configured to cover the third opening O3. More specifically, the third cover 50 is configured to cover a portion of the motor M exposed downward through the third opening O3. In the present example embodiment, the third cover 50 is configured to cover the water-cooled portion Mb of the motor M. The portion (water-cooled portion Mb) of the motor M exposed downward through the third opening O3 is covered by the third cover 50 from below.

In the present example embodiment, the third cover 50 is configured to partially cover the third opening O3. A portion of the third opening O3 between a front edge of the third cover 50 and the rear edge of the bottom plate 44 and a portion of the third opening O3 between a rear edge of the third cover 50 and the rear plate 43 are not covered by the third cover 50. The third cover 50 is pressed against the lateral plate 45 from below and is fixed to the lateral plate 45 by a plurality of (for example, two in the present example embodiment) bolts 53.

Here, a transmission shaft 54 to transmit motive power from the motor M (motive power from the transmission 16) to the left and right front wheels 10 is provided below the bottom plate 44. The transmission shaft 54 is held by the third cover 50 via a stay 55.

Other Example Embodiments

In the above-described example embodiments, the first cover 48 is configured to partially cover the first opening O1. However, the first cover 48 may be configured to cover the entire first opening O1.

In the above-described example embodiments, the second cover 49 is configured to cover the entire second opening O2. However, the second cover 49 may be configured to partially cover the second opening O2.

In the present example embodiment, the third cover 50 is configured to partially cover the third opening O3. However, the third cover 50 may be configured to cover the entire third opening O3.

In the above-described example embodiments, the third cover 50 is configured to cover the water-cooled portion Mb of the motor M. However, the third cover 50 may be configured to cover a portion other than the water-cooled portion Mb of the motor M, in addition to the water-cooled portion Mb of the motor M.

In the above-described example embodiments, the second cover 49 includes the four drain holes 49a. However, the first cover 48 may include one to three, or five or more, drain holes 49a.

In the above-described example embodiments, the transmission shaft 54 is held by the third cover 50. However, the transmission shaft 54 may be held by the second cover 49 instead of the third cover 50 or together with the third cover 50.

Example embodiments of the present invention are applicable to not only tractors but also combine harvesters, rice transplanters, and utility vehicles (multipurpose vehicles).

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
   a battery;
   an inverter to convert DC power from the battery to AC power;
   a motor drivable by electric power supplied from the inverter;
   a travel device drivable by the motor;
   a DC-DC converter to step down electric power from the battery;
   a first harness connecting the battery and the DC-DC converter;
   a second harness connecting the inverter and the motor;
   a body frame including a first opening through which the first harness is exposed downward, a second opening through which the second harness is exposed downward, and a third opening through which the motor is exposed downward, and supporting the battery, the inverter, the motor, and the DC-DC converter;

a first removable cover covering a portion of the first harness exposed downward through the first opening;

a second removable cover covering a portion of the second harness exposed downward through the second opening; and a third removable cover covering a portion of the motor exposed downward through the third opening.

2. The electric work vehicle according to claim 1, wherein the motor is water-cooled; and the third cover covers a water-cooled portion of the motor.

3. The electric work vehicle according to claim 1, wherein at least any of the first cover, the second cover, or the third cover includes a drain hole.

4. The electric work vehicle according to claim 1, further comprising:

a transmission shaft to transmit motive power from the motor to the travel device; wherein the transmission shaft is held by at least any of the first cover, the second cover, or the third cover.

\* \* \* \* \*